(12) United States Patent
De Wit et al.

(10) Patent No.: US 8,476,567 B2
(45) Date of Patent: Jul. 2, 2013

(54) ACTIVE PIXEL WITH PRECHARGING CIRCUIT

(75) Inventors: Yannick De Wit, Wilrijk (BE); Tom Walschap, Bornem (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 761 days.

(21) Appl. No.: 12/284,491

(22) Filed: Sep. 22, 2008

(65) Prior Publication Data

US 2010/0072350 A1    Mar. 25, 2010

(51) Int. Cl.
*H01J 40/14*    (2006.01)

(52) U.S. Cl.
USPC ............ 250/208.1; 250/214 R; 327/514; 257/291

(58) Field of Classification Search
USPC ............ 250/208.1, 214 R, 214.1; 327/514, 327/515, 437; 257/290–292
See application file for complete search history.

(56) References Cited

U.S. PATENT DOCUMENTS

| | | |
|---|---|---|
| 3,770,968 A | 11/1973 | Hession et al. |
| 3,904,818 A | 9/1975 | Kovac |
| 4,148,048 A | 4/1979 | Takemoto et al. |
| 4,253,120 A | 2/1981 | Levine |
| 4,373,167 A | 2/1983 | Yamada |
| 4,389,661 A | 6/1983 | Yamada |
| 4,465,939 A | 8/1984 | Tamura |
| 4,473,836 A | 9/1984 | Chamberlain |
| 4,479,139 A | 10/1984 | Parrish |
| 4,484,210 A | 11/1984 | Shiraki et al. |
| 4,498,013 A | 2/1985 | Kuroda et al. |
| 4,532,551 A | 7/1985 | Kurata et al. |
| 4,565,756 A | 1/1986 | Needs et al. |
| 4,580,103 A | 4/1986 | Tompsett |
| 4,589,028 A | 5/1986 | Ochi |
| 4,630,091 A | 12/1986 | Kuroda et al. |

(Continued)

FOREIGN PATENT DOCUMENTS

| | | |
|---|---|---|
| CA | 2132629 A1 | 9/1993 |
| EP | 0260954 A2 | 3/1988 |

(Continued)

OTHER PUBLICATIONS

Orly Yadid-Pecht et al., "A Random Access Photodiode Array for Intelligent Image Capture", IEEE Transactions on Electron Devices, vol. 38, No. 8, Aug. 1991, pp. 1772-1780.

(Continued)

*Primary Examiner* — Seung C Sohn (57) ABSTRACT

An active pixel including a precharge circuit for a sample and hold (S/H) stage and methods of operating the same are provided. In addition to the precharge circuit and S/H stage, the pixel may include a sensor circuit to generate a signal in response to electromagnetic radiation received on a photodetector included therein, and a multiplexer circuit. The S/H stage may include a switching-element to couple the signal from the sensor circuit to a capacitor element in the S/H stage to read-out and store the signal. The multiplexer circuit may include a switching-element coupled to an output node of the capacitor element to couple the signal to a column. The precharge circuit may include a switching-element coupled between the output node of the capacitor element and the column to precharge the capacitor element to a fixed voltage applied to the column when the S/H stage is not reading-out the signal.

20 Claims, 5 Drawing Sheets

U.S. PATENT DOCUMENTS

| | | |
|---|---|---|
| 4,647,975 A | 3/1987 | Alston et al. |
| 4,696,021 A | 9/1987 | Kawahara et al. |
| 4,774,557 A | 9/1988 | Kosonocky |
| 4,814,848 A | 3/1989 | Akimoto et al. |
| 4,831,426 A | 5/1989 | Kimata et al. |
| 4,843,473 A | 6/1989 | Bencuya et al. |
| 4,914,493 A | 4/1990 | Shiromizu |
| 4,914,519 A | 4/1990 | Hashimoto et al. |
| 4,951,105 A | 8/1990 | Yamada |
| 4,984,044 A | 1/1991 | Yamamura |
| 4,984,047 A | 1/1991 | Stevens |
| 4,998,265 A | 3/1991 | Kimata |
| 5,001,359 A | 3/1991 | Hashimoto et al. |
| 5,084,747 A | 1/1992 | Miyawaki |
| 5,101,253 A | 3/1992 | Mizutani et al. |
| 5,128,534 A | 7/1992 | Wyles et al. |
| 5,146,074 A | 9/1992 | Kawahara et al. |
| 5,153,420 A | 10/1992 | Hack et al. |
| 5,164,832 A | 11/1992 | Halvis et al. |
| 5,182,623 A | 1/1993 | Hynecek |
| 5,191,398 A | 3/1993 | Mutoh |
| 5,196,719 A | 3/1993 | Miwada |
| 5,258,845 A | 11/1993 | Kyuma et al. |
| 5,283,428 A | 2/1994 | Morishita et al. |
| 5,296,696 A | 3/1994 | Uno |
| 5,307,169 A | 4/1994 | Nagasaki et al. |
| 5,311,320 A | 5/1994 | Hashimoto |
| 5,321,528 A | 6/1994 | Nakamura |
| 5,335,008 A | 8/1994 | Hamasaki |
| 5,339,106 A | 8/1994 | Ueno et al. |
| 5,363,000 A | 11/1994 | Miyatake et al. |
| 5,381,106 A | 1/1995 | Limberg |
| 5,434,619 A | 7/1995 | Yonemoto |
| 5,436,949 A | 7/1995 | Hasegawa et al. |
| 5,461,425 A | 10/1995 | Fowler et al. |
| 5,519,207 A | 5/1996 | Morimoto |
| 5,539,461 A | 7/1996 | Andoh et al. |
| 5,576,763 A | 11/1996 | Ackland et al. |
| 5,578,842 A | 11/1996 | Shinji |
| 5,585,652 A | 12/1996 | Kamasz et al. |
| 5,587,596 A | 12/1996 | Chi et al. |
| 5,608,204 A | 3/1997 | Hofflinger et al. |
| 5,608,243 A | 3/1997 | Chi et al. |
| 5,614,744 A | 3/1997 | Merrill |
| 5,625,210 A | 4/1997 | Lee et al. |
| 5,668,390 A | 9/1997 | Morimoto |
| 5,675,158 A | 10/1997 | Lee |
| 5,714,753 A | 2/1998 | Park |
| 5,742,047 A | 4/1998 | Buhler et al. |
| 5,754,228 A | 5/1998 | Dyck |
| 5,786,607 A | 7/1998 | Ishikawa et al. |
| 5,790,191 A | 8/1998 | Zhang |
| 5,828,091 A | 10/1998 | Kawai |
| 5,841,126 A | 11/1998 | Fossum |
| 5,841,159 A | 11/1998 | Lee et al. |
| 5,872,371 A | 2/1999 | Guidash et al. |
| 5,872,596 A | 2/1999 | Yanai |
| 5,898,168 A | 4/1999 | Gowda et al. |
| 5,898,196 A | 4/1999 | Hook et al. |
| 5,903,021 A | 5/1999 | Lee et al. |
| 5,904,493 A | 5/1999 | Lee et al. |
| 5,933,190 A | 8/1999 | Dierickx |
| 5,942,774 A | 8/1999 | Isogai et al. |
| 5,949,483 A | 9/1999 | Fossum et al. |
| 5,952,686 A | 9/1999 | Chou et al. |
| 5,953,060 A | 9/1999 | Dierickx |
| 5,955,753 A | 9/1999 | Takahashi |
| 5,956,570 A | 9/1999 | Takizawa |
| 5,973,375 A | 10/1999 | Baukus et al. |
| 5,977,576 A | 11/1999 | Hamasaki |
| 5,990,948 A | 11/1999 | Sugiki |
| 6,011,251 A | 1/2000 | Dierickx et al. |
| 6,040,592 A | 3/2000 | McDaniel et al. |
| 6,051,857 A | 4/2000 | Miida |
| 6,100,551 A | 8/2000 | Lee et al. |
| 6,100,556 A | 8/2000 | Drowley et al. |
| 6,107,655 A | 8/2000 | Guidash |
| 6,111,271 A | 8/2000 | Snyman et al. |
| 6,115,066 A | 9/2000 | Gowda et al. |
| 6,133,563 A | 10/2000 | Clark et al. |
| 6,133,954 A | 10/2000 | Jie et al. |
| 6,136,629 A | 10/2000 | Sin |
| 6,166,367 A | 12/2000 | Cho |
| 6,172,831 B1 | 1/2001 | Usui |
| 6,188,093 B1 | 2/2001 | Isogai et al. |
| 6,194,702 B1 | 2/2001 | Hook et al. |
| 6,204,524 B1 | 3/2001 | Rhodes |
| 6,225,670 B1 | 5/2001 | Dierickx |
| 6,233,066 B1 | 5/2001 | Kojima et al. |
| 6,313,760 B1 | 11/2001 | Jones |
| 6,456,326 B2 | 9/2002 | Fossum et al. |
| 6,459,077 B1 | 10/2002 | Hynecek |
| 6,480,227 B1 | 11/2002 | Yoneyama |
| 6,545,303 B1 | 4/2003 | Scheffer |
| 6,570,618 B1 | 5/2003 | Hashi |
| 6,778,214 B1 | 8/2004 | Toma |
| 6,812,539 B1 | 11/2004 | Rhodes |
| 6,815,791 B1 | 11/2004 | Dierickx |
| 6,836,291 B1 | 12/2004 | Nakamura et al. |
| 6,859,231 B1 | 2/2005 | Sumi et al. |
| 6,917,029 B2 | 7/2005 | Dierickx |
| 7,106,373 B1 | 9/2006 | Dierickx |
| 7,106,915 B2 | 9/2006 | Dierickx |
| 7,224,389 B2 | 5/2007 | Dierickx |
| 7,289,148 B1 | 10/2007 | Dierickx |
| 2003/0011694 A1 | 1/2003 | Dierickx |
| 2003/0011829 A1 | 1/2003 | Dierickx |
| 2004/0235215 A1 | 11/2004 | Komori |
| 2005/0088553 A1 | 4/2005 | Kuwazawa |
| 2005/0099517 A1 | 5/2005 | Kuwazawa |
| 2005/0167602 A1 | 8/2005 | Dierickx |
| 2005/0270394 A1* | 12/2005 | Dierickx et al. ............ 348/308 |
| 2008/0074524 A1 | 3/2008 | Panicacci |

FOREIGN PATENT DOCUMENTS

| | | |
|---|---|---|
| EP | 0481373 A2 | 4/1992 |
| EP | 0548987 A2 | 6/1993 |
| EP | 0657863 A2 | 6/1995 |
| EP | 0739039 A2 | 10/1996 |
| EP | 0773669 A2 | 5/1997 |
| GB | 2324651 A2 | 10/1998 |
| JP | 09321266 A | 12/1997 |
| WO | 93/19489 A2 | 9/1993 |
| WO | WO 99/30368 | 6/1999 |

OTHER PUBLICATIONS

J. Bogaets et al., "High-end CMOS Active Pixel Sensor for Hyperspectral Imaging", 2005 IEEE Workshop on Charge-Coupled Devices and Advanced Image Sensors, R11, pp. 39-43, Jun. 9-11, 2005, Karuizawa Prince Hotel, Karuizawa, Nagano, Japan.

Herman Witters, et al., "1024 × 1280 pixel dual shutter APS for industrial vision", Sensors and Camera Systems for Scientific, Industrial, and Digital Photography Applications IV, Proceedings of SPIE-IS&T Electronic Imaging, SPIE vol. 5017 (2003), pp. 19-23.

Recontres de Technologies Spatiales, "Systemes Imageurs A Haute Resolution (OT1), Développement d'un démonstrateur de détecteur APS <<snapshot>>", Toulouse 5 & 6 Octobre 2006, pp. 1-16.

Bart Dierickx et al., "NIR-enhanced image sensor using multiple epitaxial layers", Sensors and Camera Systems for Scientific, Industrial, and Digital Photography Applications V, Proceedings of, SPIE vol. 5301 (2004), pp. 205-212.

USPTO Miscellaneous Action for U.S. Appl. No. 09/906,418 dated Mar. 2, 2007; 3 pages.

USPTO Notice of Allowance for U.S. Appl. No. 09/906,418 dated Feb. 1, 2007; 6 pages.

USPTO Non-Final Rejection for U.S. Appl. No. 09/906,418 dated Oct. 6, 2005; 9 pages.

USPTO Final Rejection for U.S. Appl. No. 09/906,418 dated Jun. 15, 2005; 11 pages.

USPTO Non-Final Rejection for U.S. Appl. No. 09/906,418 dated Feb. 28, 2005; 12 pages.

USPTO Notice of Allowance for U.S. Appl. No. 09/906,405 dated Apr. 21, 2006; 5 pages.

USPTO Non-Final Rejection for U.S. Appl. No. 09/906,405 dated Dec. 12, 2005; 9 pages.
USPTO Non-Final Rejection for U.S. Appl. No. 09/908,405 dated Jun. 27, 2005; 8 pages.
USPTO Non-Final Rejection for U.S. Appl. No. 09/906,405 dated Nov. 30, 2004; 9 pages.
USPTO Requirement for Restriction/Election for U.S. Appl. No. 09/906,405 dated Aug. 4, 2004; 4 pages.
USPTO Notice of Allowance for U.S. Appl. No. 09/308,032 dated Jun. 29, 2007; 9 pages.
USPTO Final Rejection for U.S. Appl. No. 09/308,032 dated Apr. 4, 2007, 5 pages.
USPTO Non-Final Rejection for U.S. Appl. No. 09/308,032 dated Nov. 1, 2006; 10 pages.
USPTO Final Rejection for U.S. Appl. No. 09/308,032 dated Jan. 23, 2006; 6 pages.
USPTO Non-Final Rejection for U.S. Appl. No. 09/308,032 dated Apr. 20, 2005; 5 pages.
USPTO Advisory Action for U.S. Appl. No. 09/308,032 dated Dec. 23, 2004; 3 pages.
USPTO Final Rejection for U.S. Appl. No. 09/308,032 dated Aug. 23, 2004; 5 pages.
USPTO Non-Final Rejection for U.S. Appl. No. 09/308,032 dated Apr. 6, 2004; 4 pages.
USPTO Advisory Action for U.S. Appl. No. 091308,032 dated Jan. 26, 2004; 2 pages.
USPTO Final Rejection for U.S. Appl. No. 09/308,032 dated Sep. 24, 2003; 6 pages.
USPTO Non-Final Rejection for U.S. Appl. No. 09/308,032 dated Apr. 9, 2003; 7 pages.
USPTO Miscellaneous Action for U.S. Appl. No. 09/460,630 dated Aug. 16, 2004; 2 pages.
USPTO Notice of Allowance for U.S. Appl. No. 09/460,630 dated Feb. 27, 2004; 6 pages.
USPTO Non-Final Rejection for U.S. Appl. No. 09/460,630 dated Aug. 14, 2003; 6 pages.
USPTO Final Rejection for U.S. Appl. No. 09/460,630 dated Jan. 24, 2003; 9 pages.
USPTO Non-Final Rejection for U.S. Appl. No. 09/460,630 dated Jun. 10, 2002; 5 pages.
USPTO Final Rejection for U.S. Appl. No. 09/460,630 dated Dec. 6, 2001, 6 pages.
USPTO Non-Final Rejection for U.S. Appl. No. 09/460,630 dated May 23, 2001; 7 pages.
USPTO Requirement for Restriction/Election for U.S. Appl. No. 09/460,630 dated Mar. 21, 2001; 4 pages.
USPTO Miscellaneous Action for U.S. Appl. No. 09/460,630 dated Feb. 1, 2000; 1 page.
USPTO Notice of Allowance for U.S. Appl. No. 10/984,485 dated Apr. 9, 2007; 7 pages.
USPTO Non-Final Rejection for U.S. Appl. No. 10/984,485 dated Nov. 15, 2006; 8 pages.
USPTO Notice of Allowance for U.S. Appl. No. 09/736,651 dated Nov. 29, 2006; 7 pages.
USPTO Non-Final Rejection for U.S. Appl. No. 09/736,651 dated Jul. 12, 2006; 6 pages.
USPTO Non-Final Rejection for U.S. Appl. No. 09/736,651 dated Mar. 9, 2006; 8 pages.
USPTO Advisory Action for U.S. Appl. No. 09/736,651 dated Dec. 12, 2005; 3 pages.
USPTO Final Rejection for U.S. Appl. No. 09/736,651 dated Sep. 19, 2005; 7 pages.
USPTO Non-Final Rejection for U.S. Appl. No. 09/736,651 dated Apr. 8, 2005; 7 pages.
USPTO Advisory Action for U.S. Appl. No. 09/736,651 dated Feb. 24, 2005; 3 pages.
USPTO Final Rejection for U.S. Appl. No. 09/736,651 dated Nov. 17, 2004; 6 pages.
USPTO Not Rejection for U.S. Appl. No. 09/736,651 dated Jun. 2, 2004; 7 pages.
USPTO Advisory Action for U.S. Appl. No. 09/736,651 dated Apr. 19, 2004; 3 pages.
USPTO Final Rejection for U.S. Appl. No. 091736,651 dated Feb. 4, 2004; 7 pages.
USPTO Non-Final Rejection for U.S. Appl. No. 091736,651 dated Aug. 20, 2003; 6 pages.
USPTO Advisory Action for U.S. Appl. No. 09/736,651 dated Jun. 11, 2003; 3 pages.
USPTO Final Rejection for U.S. Appl. No. 09/736,651 dated Apr. 7, 2003; 6 pages.
USPTO Non-Final Rejection for U.S. Appl. No. 09/736,651 dated Sep. 11, 2002; 5 pages.
USPTO Requirement for Restriction/Election for U.S. Appl. No. 09/736,651 dated Jul. 15, 2002; 4 pages.
USPTO Final Rejection for U.S. Appl. No. 11/707,723 dated Apr. 14, 2008; 9 pages.
USPTO Non-Final Rejection for U.S. Appl. No. 11/707,723 dated Oct. 15, 2007; 5 pages.
USPTO Requirement for Restriction/Election for U.S. Appl. No. 11/707,723 dated Aug. 28, 2007; 5 pages.
Martin at al., "Dynamic Offset Null," IBM Technical Disclosure Bulletin, vol. 23, No. 9, Feb. 1981, pp. 4195-4196; 2 pages.
PCT International Search Report for International Application No. PCT/BE98/00139 dated Nov. 13, 1998; 4 pages.
USPTO Miscellaneous Action for U.S. Appl. No. 10/187,479 dated Jun. 1, 2005; 1 page.
USPTO Notice of Allowance for U.S. Appl. No. 10/187,479 dated Dec. 22, 2004; 4 pages.
USPTO Final Rejection for U.S. Appl. No. 10/187,479 dated Sep. 2, 2004; 5 pages.
USPTO Non-Final Rejection for U.S. Appl. No. 10/187,479 dated Apr. 28, 2004; 5 pages.
USPTO Non-Final Rejection for U.S. Appl. No. 10/187,479 dated Jan. 2, 2004; 4 pages.
USPTO Non-Final Rejection for U.S. Appl. No. 11/030,721 dated Jun. 8, 2009; 12 pages.
USPTO Notice of Allowance for U.S. Appl. No. 09/460,473 dated May 19, 2006; 2 pages.
USPTO Notice of Allowance for U.S. Appl. No. 09/460,473 dated Oct. 6, 2005; 6 pages.
USPTO Notice of Allowance for U.S. Appl. No. 09/460,473 dated Jan. 28, 2005; 4 pages.
USPTO Final Rejection for U.S. Appl. No. 09/460,473 dated Aug. 27, 2004; 8 pages.
USPTO Non-Final Rejection for U.S. Appl. No. 09/460,473 dated Jan. 26, 2004; 8 pages.
USPTO Non-Final Rejection for U.S. Appl. No. 09/460,473 dated Jul. 18, 2003; 8 pages.
European Search Report for Application No. 01204595.1-2203 dated Nov. 28, 2005; 8 pages.
Partial European Search Report, European Patent Office, Sep. 28, 2005, Application No. 01204595.1-2203; 4 pages.
Stefan Lauxtermann et al., "A High Speed CMOS Imager Acquiring 5000 Frames/Sec," IEDM 99, 0-7803-5410-9/99, 1999 IEEE, pp. 875-878; 4 pages.
Aw et al., "A 128x128-Pixel Standard-CMOS Image Sensor with Electronic Shutter," ISSCC96/Session 11/Electronic Imaging Circuits/Paper FA 11.2, 1996 IEEE International Solid-State Circuits Conference, pp. 180-181 and 440; 3 pages.
Patent Abstracts of Japan Publication No. JP 59-67791, publication date Apr. 17, 1984; 1 page.
Aoki et al., "A Collinear 3-Chip Image Sensor," IEEE International Solid-State Circuits Conference, 1985, pp. 102-103; 3 pages.
Horii et al,, "A 490 x 404 Element Imager for a Single-Chip Color Camera," IEEE International Solid-State Circuits Conference, 1985, pp. 96-97; 2 pages.
Nagakawa et al., "A 580 x 500-Element CCD Imager with a Shallow Flat P Well," IEEE International Solid-State Circuits Conference, 1985, pp. 98-99; 2 pages.
Mahowald, "Silicon Retina with Adaptive Photoreceptors," SPIE, vol. 1473, 1991, pp. 52-58; 7 pages.
Mann, "Implementing Early Visual Processing in Analog VLSI: Light Adaptation," SPIE, vol. 1473, 1991, pp. 128-136; 10 pages.

Ono et al., "Analysis of Smear Noise in Interine-CCD Image Sensor with Gate-Free Isolation Structure," Abstract of the 1991 International Conference on Solid State Devices and Materials, Yokohama, 1991, pp. 68-70; 6 pages.

Yadid-Pecht et al., "A Random Access Photodiode Array for Intelligent Image Capture," IEEE Transactions on Electron Devices, vol. 38, No. 8, Aug. 1991, pp. 1772-1780; 9 pages.

Ricquier et al., "Pixel Structure with Logarithmic Response for Intelligent and Flexible Imager Architectures," Microelectronic Engineering, 1992, pp. 631-634; 4 pages.

Sevenhans et al., "A 400mm Long Linear X-Ray Sensitive Image Sensor," IEEE International Solid-State Circuits Conference, 1987, pp. 108-109; 4 pages.

Anderson et al., "A Single Chip Sensor & Image Processor of Fingerprint Verification," IEEE 1991 Custom Integrated Circuits Conference, May 12-15, 1991; pp. 12.1.1-12.1.4; 4 pages.

Bart Dierickx, "XYW Detector: A Smart Two-Dimensional Particle Sensor," Nuclear Instruments and Methods in Physics Research A275, North-Holland Physics Publishing Division, 1989, pp. 542-544; 3 pages.

Klein, "Design and Performance of Semiconductor Detectors with Integrated Amplification and Charge Storage Capability," Nuclear Instruments and Methods in Physics Research A305, 1991, pp. 517-526; 11 pages.

Martin et al, "Dynamic Offset Null," IBM Technical Disclosure Bulletin, No. 23, No. 9, Feb. 1981, pp. 4195-4196; 2 pages.

USPTO Notice of Allowance for U.S. Appl. No. 09/021,010 dated Nov. 6, 2000; 2 pages.

USPTO Non-Final Rejection for U.S. Appl. No. 09/021,010 dated Apr. 25, 2000; 3 pages.

USPTO Non-Final Rejection for U.S. Appl. No. 09/021,010 dated Oct. 1, 1999; 1 pages.

USPTO Requirement for Restriction/Election for U.S. Appl. No. 09/021,010 dated Aug. 24, 1998; 3 pages.

USPTO Notice of Allowance for U.S. Appl. No. 08/635,035 dated Nov. 24, 1998; 2 pages.

USPTO Non-Final Rejection for U.S. Appl. No. 08/635,035 dated Jun. 1, 1998; 7 pages.

USPTO Requirement for Restriction for U.S. Appl. No. 08/635,035 dated Mar. 5, 1998; 5 pages.

USPTO Advisory Action for U.S. Appl. No. 09/157,655 dated Jun. 12, 2002; 3 pages.

USPTO Final Rejection for U.S. Appl. No. 09/157,655 dated Mar. 28, 2002; 6 pages.

USPTO Non-Final Rejection for U.S. Appl. No. 09/157,655 dated Oct. 4, 2001; 5 pages.

USPTO Advisory Action for U.S. Appl. No. 09/157,655 dated Jun. 19, 2001; 3 pages.

USPTO Final Rejection for U.S. Appl. No. 09/157,655 dated Mar. 12, 2001; 6 pages.

USPTO Non-Final Rejection for U.S. Appl. No. 09/157,655 dated Jul. 5, 2000; 6 pages.

USPTO Requirement for Restriction/Election for U.S. Appl. No. 09/157,655 dated Jul. 12, 2002; 3 pages.

International Search Report of the International Searching Authority for International Application No. PCT/US09/57587 mailed Nov. 30, 2009; 2 pages.

The Written Opinion of the International Searching Authority for International Application No. PCT/US09/57587 mailed Nov. 30, 2009; 3 pages.

USPTO Non-Final Rejection for U.S. Appl. No. 11/030,721 dated Dec. 6, 2010; 9 pages.

USPTO Advisory Action for U.S. Appl. No. 11/030,721 dated Oct. 29, 2010; 3 pages.

USPTO Final Rejection for U.S. Appl. No. 11/030,721 dated Aug. 25, 2010; 12 pages.

USPTO Non-Final Rejection for U.S. Appl. No. 11/030,721 dated Mar. 15, 2010; 14 pages.

USPTO Advisory Action for U.S. Appl. No. 11/030,721 dated Feb. 23, 2010; 3 pages.

USPTO Final Rejection for U.S. Appl. No. 11/030,721 dated Dec. 4, 2009; 17 pages.

USPTO Notice of Allowance for U.S. Appl. No. 11/136,545 dated Aug. 26, 2010; 9 pages.

USPTO Non-Final Rejection for U.S. Appl. No. 11/136,545 dated Mar. 18, 2010; 15 pages.

USPTO Advisory Action for U.S. Appl. No. 11/136,545 dated Feb. 16, 2010; 6 pages.

USPTO Non-Final Rejection for U.S. Appl. No. 11/136,545 dated Apr. 4, 2008; 9 pages.

USPTO Final Rejection for U.S. Appl. No. 11/136,545 dated Nov. 19, 2009; 12 pages.

USPTO Non-Final Rejection for U.S. Appl. No. 11/136,545 dated May 6, 2009; 10 pages.

USPTO Final Rejection for U.S. Appl. No. 11/136,545 dated Nov. 26, 2008; 8 pages.

\* cited by examiner

ACTIVE PIXEL WITH PRECHARGING CIRCUIT

TECHNICAL FIELD

The present disclosure relates generally to an active pixel including a precharge circuit.

BACKGROUND

Image sensors are widely used in digital cameras and other imaging devices to convert an optical image to an electric signal. Image sensors are fabricated as integrated circuit including a matrix or array of active picture elements or pixels.

BRIEF DESCRIPTION OF THE DRAWINGS

These and various other features of the interface device and methods for using the same will be apparent upon reading of the following detailed description in conjunction with the accompanying drawings and the appended claims provided below, where:

DETAILED DESCRIPTION

For purposes of clarity, many of the details of image sensors in general and to image sensors including arrays of active pixels in particular, which are widely known and not relevant to the present control system and method have been omitted from the following description.

Figure 1:
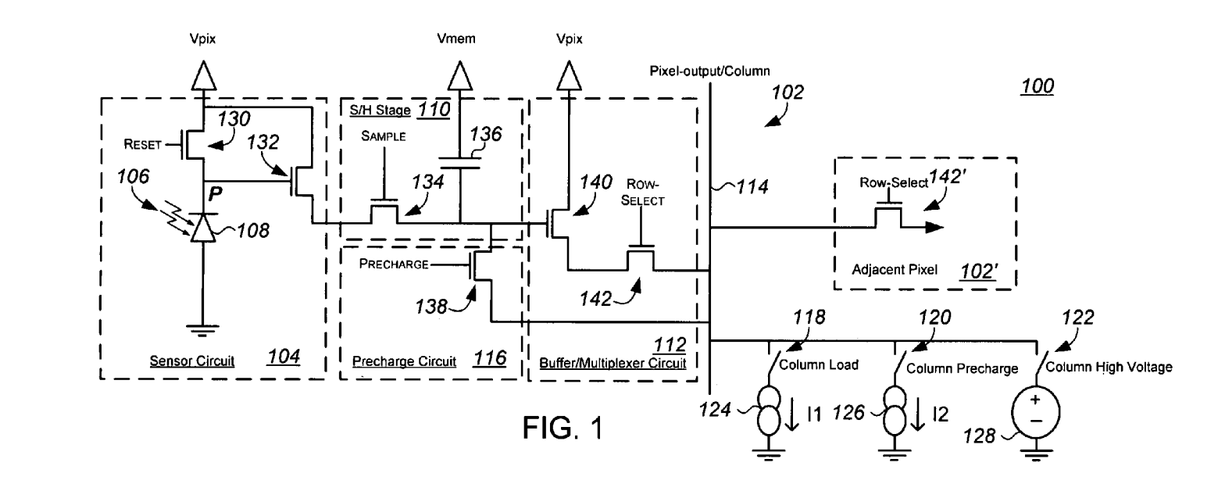
FIG. 1 is a simplified schematic diagram of a portion of an image sensor including an active pixel comprising an in-pixel precharge circuit and sample and hold (S/H) stage according to one embodiment.

A simplified schematic diagram of a portion of an image sensor 100 including an embodiment of a single, active pixel 102 with an in-pixel sample and hold (S/H) stage and precharge circuit is shown in FIG. 1. Generally the active pixel 102 is one of a number of pixels in an array of pixels (not shown) arranged in multiple rows and multiple columns, each column shared by multiple pixel outputs from the multiple rows of pixels to enable a pipelined or sequential readout of each row of pixels in the array through the shared columns coupled thereto. The array of pixels is formed in a layer of semiconductor material on a common, shared wafer or substrate (not shown), which may include other elements and circuits of the image sensor. The semiconductor layer may include any known semiconductor material including silicon, germanium, and indium-gallium-arsenide.

Referring to FIG. 1, the active pixel 102 generally includes a sensor circuit 104 to generate a signal in response to electromagnetic radiation 106 (light) received on a photosensor or photodetector 108. Signals from the sensor circuit 104 are electrically coupled to a sample and hold (S/H) stage 110, which reads-out or samples and temporarily stores the signals. The pixel 102 further includes a multiplexer or buffer/multiplexer circuit 112 to couple an output node of the S/H stage 110 to a pixel output or column 114. A precharge circuit 116 is also coupled to the output node of the S/H stage 110 to precharge a storage element therein to a precharge voltage prior to the S/H stage sampling the signal from the sensor circuit 104. The image sensor 100 further includes a number of switching-elements 118, 120 and 122 to sequentially couple the column 114 to an output load 124, a column precharge source or current path (I2 126) and a column high voltage supply 128 respectively.

The photodetector 108 can include one or more photodiodes (PD), phototransistors, photoresistors or a charge-coupled device (CCD), which generates distinct changes in current, or voltage or a charge on photodetector in response to incident electromagnetic radiation. In the embodiment shown in FIG. 1 the photodetector 108 is a reverse-biased photodiode coupled between a positive pixel voltage supply (Vpix) and ground. When exposed to electromagnetic radiation (light) 106, the semiconductor material of which the photodiode is fabricated photogenerates charge carriers, e.g. electrons, in proportion to the energy of electromagnetic radiation 106 received and to the time or integration period over which the PD is exposed and to the photocurrent or current through the PD. A reset switching-element or transistor 130 periodically resets the photodetector 108 to a fixed bias, clearing all accumulated charge on the photodetector 108 at the beginning of every integration period. The sensor circuit 104 further includes a readout transistor, such as a source follower (SF) amplifier 132, having a drain connected or coupled to Vpix and a source coupled to an input of the S/H stage 110. The SF 132 generates a voltage signal corresponding to the charge accumulated on the photodetector 108, and acts as a buffer to enable the charge on the photodetector to be sampled or observed without removing the accumulated charge.

The S/H stage 110 samples and holds or stores the voltage signal from the sensor circuit 104. The S/H stage 110 includes a sample switching-element or transistor 134 electrically connected or coupled to the SF 132 at the output of the sensor circuit 104 to couple the voltage signal to a memory or capacitor element, such as a capacitor 136 in FIG. 1. More specifically, after a predetermined integration period, a sample signal (SAMPLE) is applied to a gate of the sampling transistor 134 for a predetermined sample period causing the transistor to conduct storing a voltage signal on the capacitor 136. The magnitude of the voltage signal stored on the capacitor 136 depends on the charge accumulated in the PD depletion capacitance and a transfer function of the SF 132 and sampling transistor 134.

To provide an accurate measurement or sample of the voltage signal from the sensor circuit 104, the capacitor 136 in the S/H stage 110 is precharged to delete any previous sampled value. The S/H stage 110 is driven by a simple source follower (SF 132) and, if a previous sampled value is higher or within a threshold voltage ($V_T$) of the SF 132 of the next sampled value, the SF may cut off and no sampling will take place. Thus, without precharging or clearing the capacitor element, the image sensed by the image sensor 100 may rise to a black or blank image over time.

Referring to FIG. 1, in the implementation of the S/H stage 110 shown, the capacitor 136 is coupled to a positive memory voltage supply (Vmem) and through a precharge switching element or transistor 138 in the precharge circuit 116 to the column 114. The column 114 is in turn coupled through the column precharge switch 120, to a column precharge current supply 126 to simultaneously precharge the capacitor and the column to a predetermined voltage before the sampling occurs. It will be appreciated that coupling the capacitor 136 to the column 114 for precharging, rather than to an in-pixel ground tap or a separate precharge line, as is done in other precharge circuits, decreases a surface area of the pixel taken up with non-light sensitive elements substantially increasing the fill factor of the pixels and the array, thereby increasing the sensitivity of the image sensor 100. By fill factor it is meant a ratio of the area of photosensitive elements in a pixel 102 or an array to a total area of the pixel or array. It will further be appreciated that increasing the fill factor also significantly increases the signal-to-noise (SNR) of the image sensor 100, as the SNR is directly related to the product of fill factor and quantum efficiency.

In certain embodiments, columns 114 of image sensors 100 are also precharged prior to reading the signal on capacitor 136 to clear or erase any previous voltage thereon which could lead to ghosting. In other active pixels and image sensors column precharging is accomplished during or after sampling of the voltage signal from the sensor circuit 104 in a separate step or event from that of precharging the capacitor 136. In contrast, the precharging circuit 116 of the active pixel 102 of FIG. 1 enables simultaneous precharging of the capacitor 136 and the column 114 to speed up precharging of the pixel.

Figure 2:
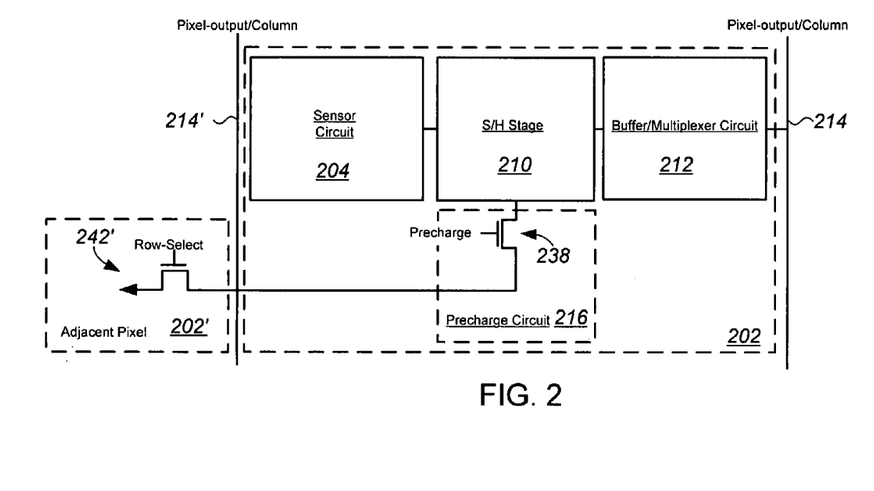
FIG. 2 is a simplified schematic diagram of a portion of an image sensor including an active pixel comprising an in-pixel precharge circuit and S/H stage according to another embodiment.

In the embodiment shown in FIG. 1 and described above, the precharge transistor 138 is coupled to the precharge current supply 126 through the same column 114 to which the buffer/multiplexer circuit 112 is coupled to readout the sampled signal from the pixel 102. The precharge transistor may alternatively be coupled to any column in the array located near the pixel in which it is included. Referring to FIG. 2 it is seen that in other embodiments the precharge transistor 238 of the precharge circuit 216 can be coupled to a column 214' different from the column 214 to which the buffer/multiplexer circuit 212 of the pixel 202 is coupled. The column 214' to which the precharge transistor 238 is coupled can include, for example, the column to which an adjacent pixel 202' located in a different column and possibly a different row in the array is coupled. In addition to the precharge circuit 216 and buffer multiplexer circuit 212, the pixel 202 includes a S/H stage 210 and a sensor circuit 204, all of which function as in the pixel 102 of FIG. 1 described above.

Optionally as in the embodiment shown in FIG. 1, the image sensor 100 further includes a column high voltage switching-element 122 and a column high voltage supply 128 to apply a fixed high voltage to the column 114 after precharging to reduce or eliminate loss of voltage stored on the capacitor 136 through drain-to-source leakage of the precharge transistor 138 by providing a negative gate to source voltage (Vgs) on the precharge transistor. In the embodiment shown in FIG. 1, this fixed high voltage can be applied during and after sampling of the sensor circuit 104 by the S/H stage 110 but may be removed prior to reading out the voltage signal on capacitor 136. After precharging the capacitor 136 and sampling the voltage signal from the sensor circuit 104, the voltage signal on capacitor 136 is readout by the buffer/multiplexer circuit 112. In the embodiment shown in FIG. 1 the buffer/multiplexer circuit 112 includes a source follower (SF) amplifier 140 that acts as a buffer and has a drain connected or coupled to Vpix and a source coupled to the column 114 through a row-select switching-element or transistor 142. For reading, a row-select signal is applied to a gate of the row-select transistor causing it to conduct and to transfer the voltage at the source of the SF amplifier 140 to the column 114. Switch 118 is also closed, coupling the column 114 to the column load 124.

Although the sensor circuit 104 and buffer/multiplexer circuit 112 are shown as including source follower (SF) amplifiers 132, 140, respectively, which serve as buffers, it will be appreciated that other amplifier configurations can also be used to serve as buffers. It will further by appreciated that the SF amplifiers 132, 140, can be included in separate buffer stages (not shown) located between the sensor circuit 104 and S/H stage 110, and between the S/H stage and buffer/multiplexer circuit 112.

Figure 3:
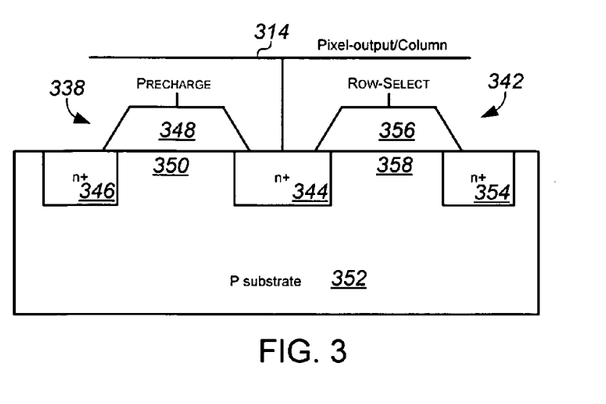
FIG. 3 is a cross section diagram for the implants of an embodiment precharge transistor and row-select transistor having a shared source implant.

In another aspect, shown in FIG. 3, in certain embodiments the precharge switching element comprises a metal-oxide-semiconductor field-effect transistor (MOSFET) 338 sharing a common source implant 344 with that of a row-select, MOSFET transistor 342 to further increase the fill factor of the pixel by reducing the area occupied by non-light sensitive transistors, thereby reducing the pitch or spacing between centers of the pixels. The precharge transistor 338 and the row-select transistor 342 are coupled through the shared source implant 344 to a column 314. The precharge transistor 338 further includes a drain implant 346 coupled to an output node of the capacitor in the S/H stage (not shown in this figure) and a gate stack or electrode 348 overlying a channel region 350 formed in the underlying substrate 352. The row-select transistor 342 further includes a drain implant 354 coupled to an output of a buffer (not shown), such as SF amplifier 140 in FIG. 1, and a gate electrode 356 overlying a channel region 358 joining the source implant 344 and the drain implant. The row-select transistor 342 with which the precharge transistor 338 shares the source implant 344 may be part of the same pixel as the precharge transistor, or may be a row-select transistor in an adjacent pixel in an array of pixels and the shared source implant may couple to a column 314 different from the column of the pixel comprising the precharge transistor.

In one embodiment, shown in FIG. 1, the precharge transistor 138 in a pixel 102 can share a source implant (not shown) with a row-select transistor 142' of an adjacent pixel 102' located in a different row in an array of pixels but coupling to the same column 114.

In an alternative embodiment, shown in FIG. 2, the precharge transistor 238 in one pixel 202 can share a source implant with a row-select transistor 242' of an adjacent pixel 202' located in a different column and possibly a different row in an array of pixels.

In the embodiment shown in FIG. 3, the precharge transistor 338 and row-select transistor 342 are NMOS transistors with n-type channels and n++doped source and drain implants fabricated in a p-type substrate. However, it will be appreciated that this is not necessarily the case and the precharge transistor and row-select transistor can instead comprise PMOS transistors with appropriating biasing and selection of the control signals (PRECHARGE and ROW-SELECT) to the gates thereof.

Figure 4:
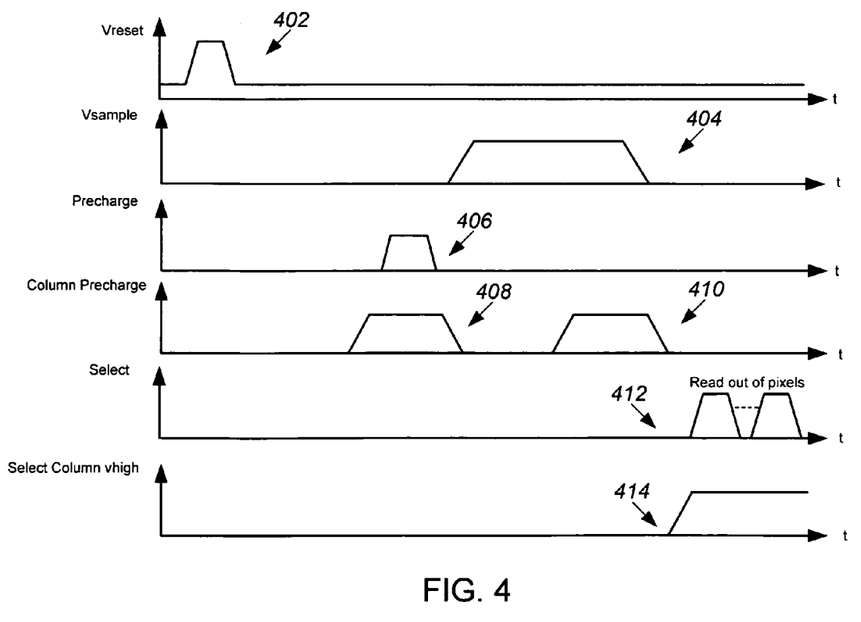
FIG. 4 is a timing chart of signals for an embodiment of a method for precharging the active pixel of FIG. 1.
Figure 5:
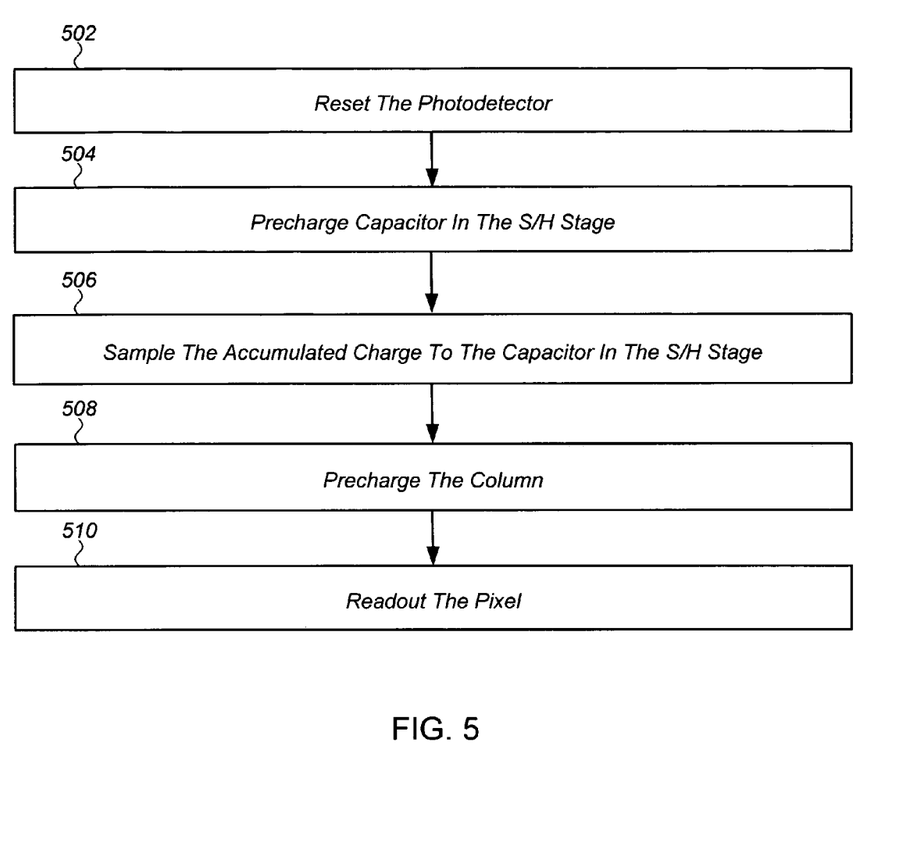
FIG. 5 is a flowchart illustrating an embodiment of a method for precharging the active pixel of FIG. 1.

A method of operating the image sensor 100 to precharge and read-out the pixel 102 of FIG. 1 will now be described with reference to the timing diagram of FIG. 4 and the flow-chart of FIG. 5. Referring to FIGS. 4 and 5, in first block (block 502) a reset signal or voltage (Vreset 402) is applied for a brief, predetermined period of time to the gate of the reset transistor 120 to clear any charge accumulated on the photodetector (PD 108). Thereafter, charge photogenerated by electromagnetic radiation 106 (light) received on the photodetector 108 is allowed to accumulate at output node P during subsequent precharging, sampling and read out steps. Next, the capacitor 136 in the S/H stage 110 is precharged (Block 504).

In one embodiment, the precharging of the capacitor 136 is accomplished by briefly applying a column precharge signal (column precharge 408) to close column precharge switching element 120 and a precharge signal (precharge 406) to the precharge transistor 138.

After the capacitor 136 has been precharged, the charge accumulated at photodiode node P in the sensor circuit 104 is then sampled by applying a sampling signal (Vsample 404) to the sampling transistor 134, causing it to conduct and transfer the voltage at the source of the SF 132 to the capacitor (Block 506). While the sampling continues a second column precharge signal (column precharge 410) can be applied to the precharge switching element 120 to precharge or maintain a complete precharge on column 114 in preparation for reading out the pixel 102 (Block 508).

After the sensor circuit 104 has been sampled and the column 114 precharged, switching-element 118 is closed to couple the column 114 to the output load 124, and a row-select signal (select 412) is applied to the row-select transistor 142, causing it to conduct and transfer the voltage at a source of the SF 140 to the column (Block 510). The multiple row-select signals (select 412) with the dashed line in between are meant to illustrate a sequential read of pixels in different rows in a single column, as row after row is read out. Switching-element 118 may be closed in response to the row-select signal (select 412)

Optionally, in embodiments in which the precharge transistor is coupled to a column of an adjacent pixel, such as that shown in FIG. 2 and described above, reading out the pixel (Block 510) can further include applying a select column high voltage signal 414 to switching-element 122 to apply a fixed high voltage to the column 214 after precharging to reduce or eliminate loss of voltage stored on the capacitor 136 through drain-to-source leakage of the precharge transistor 138.

Figure 6:
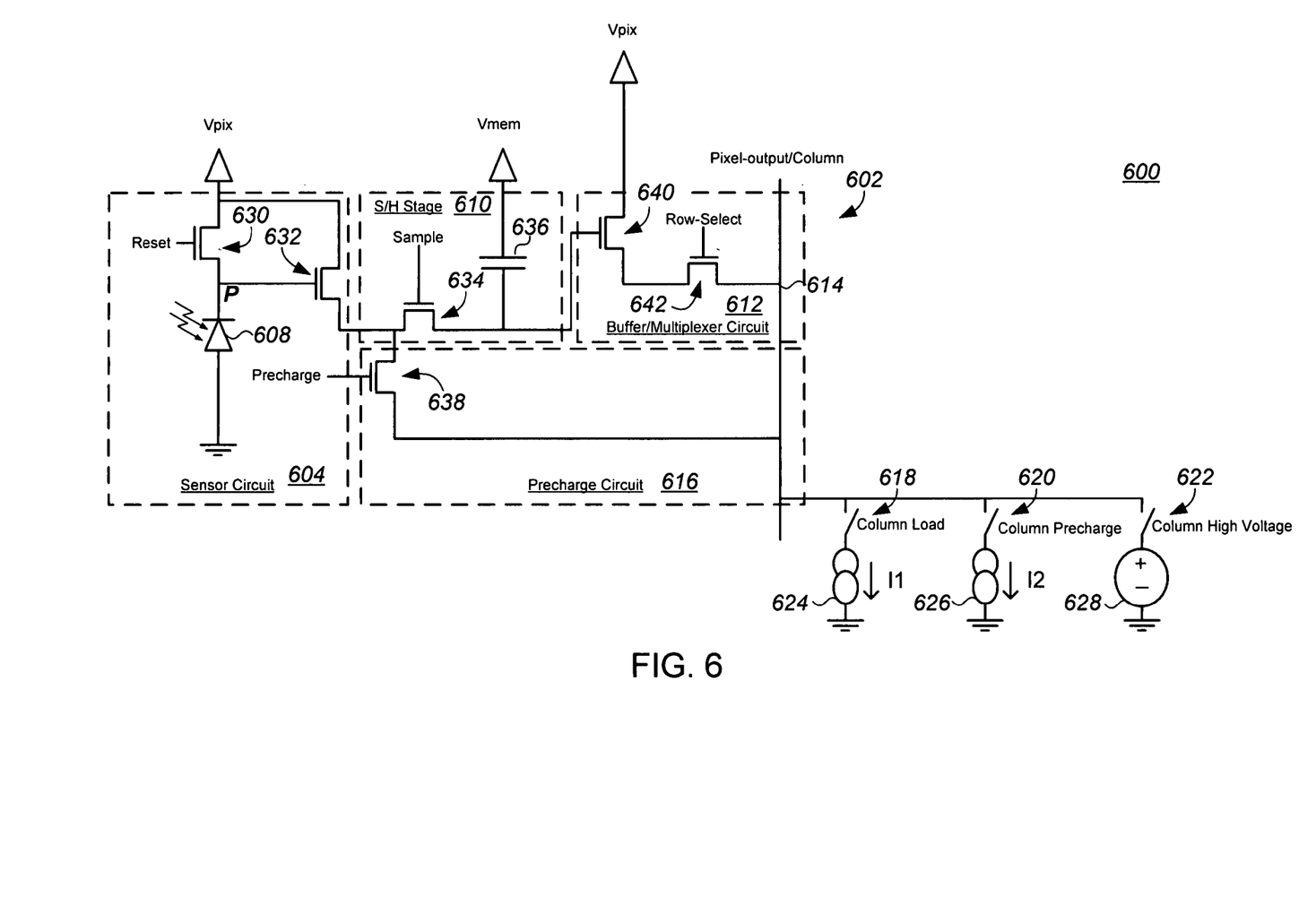
FIG. 6 is a simplified schematic diagram of a portion of an image sensor including an active pixel comprising an in-pixel precharge circuit and S/H stage according to another embodiment.

In yet another aspect, shown in FIG. 6, in certain embodiments the precharge circuit 616 or transistor 638 can be coupled to a capacitor 636 in an S/H stage 610 through a sampling transistor 634 in the S/H stage. This embodiment further reduces a loss of charge stored on the capacitor 636 through drain-to-source leakage of the precharge transistor 638.

Referring to FIG. 6, the pixel 602 includes a sensor circuit 604 having a photodetector 608 to generate a signal in response to light received thereon, a reset transistor 630, and a SF 632 buffer through which the sensor circuit is coupled to an S/H stage 610. The output of the S/H stage 610 is coupled to a column 614 through a buffer/multiplexer circuit 612 including an SF amplifier 640 which serves as buffer and a row select transistor 642. As in the embodiment of FIG. 1 described above, the image sensor 600 further includes a number of switching-elements 618, 620 and 622 to sequentially couple the column 614 to an output load 624, a column precharge source or current path (I2 626) and a column high voltage supply 628, respectively.

It will be appreciated that since the sampling transistor 634 is on during pixel precharging, the timing or sequence of signal for operating the pixel 602 of FIG. 6 is slightly different than that described above with reference to FIG. 1.

Figure 7:
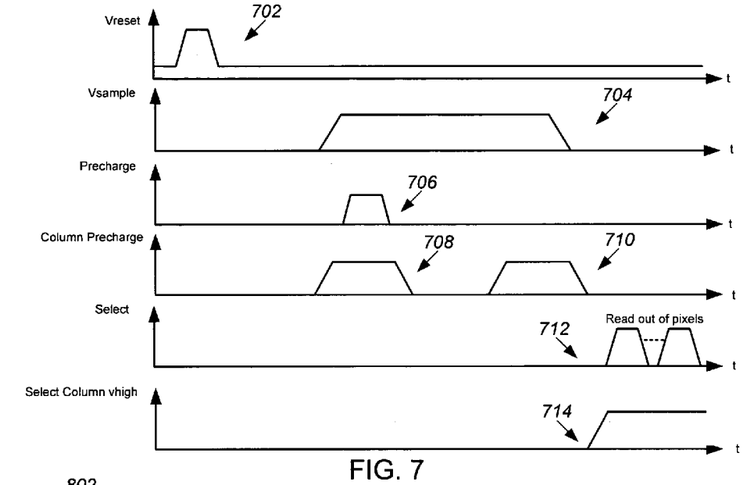
FIG. 7 is a timing chart of signals for an embodiment of a method for precharging the active pixel of FIG. 6.
Figure 8:
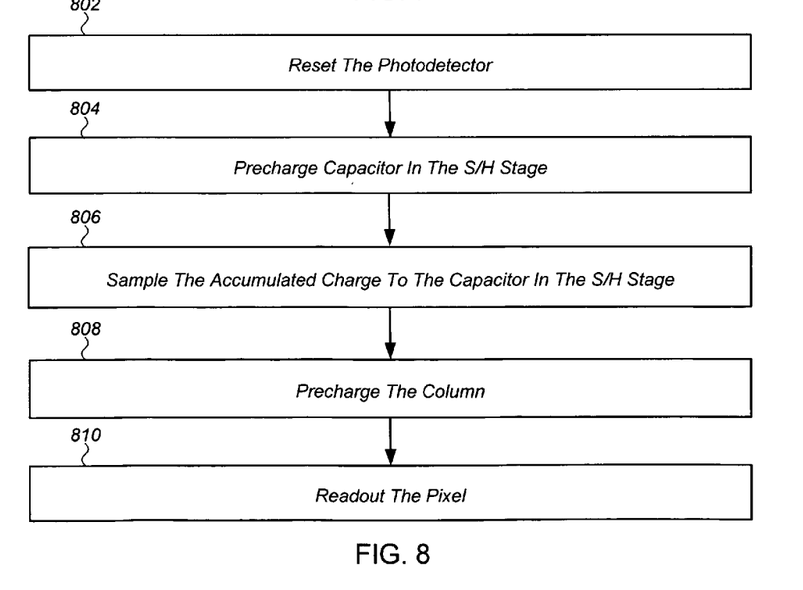
FIG. 8 is a flowchart illustrating an embodiment of a method for precharging the active pixel of FIG. 6.

A method of operating the image sensor 600 to precharge and read-out the pixel 602 of FIG. 6 will now be described with reference to the timing diagram of FIG. 7 and the flow-chart of FIG. 8. Referring to FIGS. 7 and 8, in first block (block 802) a reset signal or voltage (Vreset 702) is applied for a brief, predetermined period of time to the gate of the reset transistor 620 to clear any charge accumulated on the photodetector 608. Thereafter, charge photogenerated by light received on the photodetector 608 is allowed to accumulate at output node P.

Next, the capacitor 636 in the S/H stage 610 is precharged (Block 804) by applying a sampling signal (Vsample 704) to the sampling transistor 634, briefly applying a column precharge signal (column precharge 708) to close column precharge switching element 620 and, briefly, applying a precharge signal (precharge 706) to the precharge transistor 638.

After the capacitor 636 has been precharged, the column precharge signal 708 and precharge signal 706 are removed while the sampling signal 704 is maintained to sample the charge accumulated in the sensor circuit 604 (Block 806). While the sampling continues, a second column precharge signal (column precharge 710) can be applied to the precharge switching element 620 to precharge or maintain a complete precharge on column 614 in preparation for reading out the pixel 102 (Block 808).

After the sensor circuit 604 has been sampled and the column 614 precharged, switching-element 618 is closed to couple the column 614 to the output load 624, and a row-select signal (select 712) is applied to the row-select transistor 642, causing it to conduct and transfer the voltage at a source of the SF 640 to the column (Block 810).

Thus, embodiments of a precharging circuit and a method for precharging an in-pixel S/H stage of an active pixel that increases fill factor and SNR while decreasing precharge time have been described. Although the present disclosure has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

In the forgoing description, for purposes of explanation, numerous specific details have been set forth in order to provide a thorough understanding of the control system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the control system or method. The appearances of the phrase "one embodiment" in various places in the specification do not necessarily all refer to the same embodiment. The term "to couple" as used herein may include both to directly electrically connect two or more components or elements and to indirectly connect through one or more intervening components.

What is claimed is:

1. An active pixel comprising:
   a sensor circuit to generate a signal in response to electromagnetic radiation received on a photodetector included therein;
   a sample and hold (S/H) stage coupled to an output of the sensor circuit to read-out and store the signal, the S/H stage including a sample switching-element to couple the signal from the sensor circuit to a capacitor element in the S/H stage to store the signal;
   a buffer/multiplexer circuit including a row-select switching-element coupled to an output node of the capacitor element to couple the signal to a column; and
   a precharge circuit including a precharge switching-element coupled between the output node of the capacitor element and the column to precharge the capacitor element to a precharge voltage applied to the column when the S/H stage is not reading-out the signal from the sensor circuit.

2. An active pixel according to claim 1, wherein the precharge switching-element comprises a precharge transistor having a drain coupled to the output node of the capacitor element and a source coupled to the column.

3. An active pixel according to claim 2, wherein the row-select switching-element comprises a row-select transistor having a drain coupled to the output node of the capacitor element through a buffer and a source coupled to the column, and wherein the source of the row-select transistor and the source of the precharge transistor comprise a shared source implant.

4. An active pixel according to claim 2, wherein the active pixel is one of a plurality of pixels in an array of pixels.

5. An active pixel according to claim 4, wherein the precharge transistor shares a source implant with a row-select transistor in an adjacent pixel in the array of pixels.

6. An active pixel according to claim 1, wherein the sample switching-element comprises an input node coupled to the output of the sensor circuit and a second output node coupled to the output node of the capacitor element, and wherein the precharge switching-element couples to the output node of the capacitor element through the sample switching-element.

7. An active pixel according to claim 6, wherein the sensor circuit further includes a reset switching-element and a source follower amplifier (SF) through which the sensor circuit is coupled to the S/H stage, and wherein the SF decouples the sensor circuit from the S/H stage when a reset signal is applied to the reset switching-element to enable the capacitor-element to be precharged through the sample switching-element and the precharge switching-element.

8. An active pixel according to claim 6, wherein the precharge switching-element does not couple to the output node of the capacitor element through the sample switching-element, and wherein the sample switching-element decouples the capacitor element from the sensor circuit to enable the capacitor-element to be precharged through the precharge switching-element.

9. An image sensor including an array of a plurality of active pixels, at least one of the plurality of active pixels comprising:
   a sensor circuit to generate a signal in response to electromagnetic radiation received on a photodetector included therein;
   a sample and hold (S/H) stage coupled to an output of the sensor circuit to read-out and store the signal, the S/H stage including a sample switching-element to couple the signal from the sensor circuit to a capacitor element in the S/H stage to store the signal;
   a buffer/multiplexer circuit including a row-select switching-element coupled to an output node of the capacitor element to couple the signal to a column in the array; and
   a precharge circuit including a precharge switching-element coupled between the output node of the capacitor element and the column to precharge the capacitor element to a column precharge voltage applied to the column when the S/H stage is not reading-out the signal therefrom.

10. An image sensor according to claim 9, wherein the precharge switching-element comprises a precharge transistor having a drain coupled to the output node of the capacitor element and a source coupled to the column.

11. An image sensor according to claim 10, wherein the row-select switching-element comprises a row-select transistor having a drain coupled to the output node of the capacitor element through a buffer and a source coupled to the column, and wherein the source of the row-select transistor and the source of the precharge transistor comprise a shared implant region.

12. An image sensor according to claim 11, wherein the precharge transistor shares source with the row-select transistor in an adjacent active pixel in the array of a plurality of active pixels to couple to a column in the adjacent active pixel.

13. An image sensor according to claim 10, further comprising a column high voltage switching element to apply a fixed high voltage to the column during read-out to reduce drain-source leakage through the precharge transistor from the capacitor element.

14. An image sensor according to claim 9, wherein the sample switching-element comprises an input node coupled to the output of the sensor circuit and a second output node coupled to the output node of the capacitor element, and wherein the precharge switching-element couples to the output node of the capacitor element through the sample switching-element.

15. An image sensor according to claim 14, wherein the sensor circuit further includes a reset switching-element and a source follower amplifier (SF) through which the sensor circuit is coupled to the S/H stage, and wherein the SF decouples the sensor circuit from the S/H stage when a reset signal is applied to the reset switching-element to enable the capacitor element to be precharged through the sample switching-element and the precharge switching-element.

16. A method for precharging a capacitor element in an in-pixel sample and hold (S/H) stage of an active pixel, the method comprising:
   electrically decoupling a sensor circuit in the active pixel from the S/H stage;
   electrically coupling an output node of the capacitor element to a column through a precharge transistor, the precharge transistor having a drain coupled to the output node of the capacitor element and a source coupled to the column; and
   applying a precharge voltage to the column to precharge the capacitor element and the column.

17. A method according to claim 16, wherein the active pixel further comprises a row-select transistor having a drain coupled to the output node of the capacitor element through a buffer and a source coupled to the column, and wherein the source of the row-select transistor comprises a source implant shared with the source of the precharge transistor.

18. A method according to claim 16, wherein the active pixel is one of a plurality of pixels in an array of pixels, and wherein the precharge transistor shares a source implant with a row-select transistor in an adjacent pixel in the array of pixels to couple to a column in the adjacent pixel.

19. A method according to claim 16, wherein the S/H stage further comprises a sample transistor through which the sensor circuit is coupled to the output node of the capacitor element, and wherein the precharge transistor couples to the output of the capacitor element through the sample transistor.

20. A method according to claim 16, further comprising applying a fixed high voltage to the column after precharging the capacitor element to decrease leakage through the precharge transistor during readout of the sensor circuit by the S/H stage.

* * * * *